United States Patent [19]

Sergel et al.

[11] Patent Number: 4,922,751
[45] Date of Patent: May 8, 1990

[54] METHOD AND APPARATUS FOR CHECKING THE CONCENTRICITY OR CORRECT CONTOUR OF A PNEUMATIC VEHICLE TIRE

[75] Inventors: Horst Sergel; Dieter Aschemann, both of Hanover; Klaus Gerloff, Isernhagen, all of Fed. Rep. of Germany; Alexander Kay, Embourg, Belgium; Lutz Wedemeyer, Wunstorf, Fed. Rep. of Germany

[73] Assignee: Continental Aktiengesellschaft, Hanover, Fed. Rep. of Germany

[21] Appl. No.: 245,821
[22] Filed: Sep. 16, 1988

[30] Foreign Application Priority Data

Sep. 23, 1987 [DE] Fed. Rep. of Germany ....... 3731926

[51] Int. Cl.⁵ ............................................ G01M 17/02
[52] U.S. Cl. ....................................................... 73/146
[58] Field of Search .................. 73/146; 152/DIG. 20

[56] References Cited

U.S. PATENT DOCUMENTS 4,843,871  7/1989  Flebbe ................................... 73/146

Primary Examiner—Donald O. Woodiel
Attorney, Agent, or Firm—Robert W. Becker & Associates

[57] ABSTRACT

A method and apparatus for checking the concentricity of a pneumatic vehicle tire that during operation has its bead regions mounted on the radially inner periphery of a wheel rim. The apparatus includes a two-part test rim, the sections of which are axially movable. In the region of the rim flanges, the test rim is provided with vulcanizing mold contours for receiving the bead-seating surfaces of a tire. The spaces between the tire sidewalls and the bead regions are provided with forming rings.

7 Claims, 1 Drawing Sheet

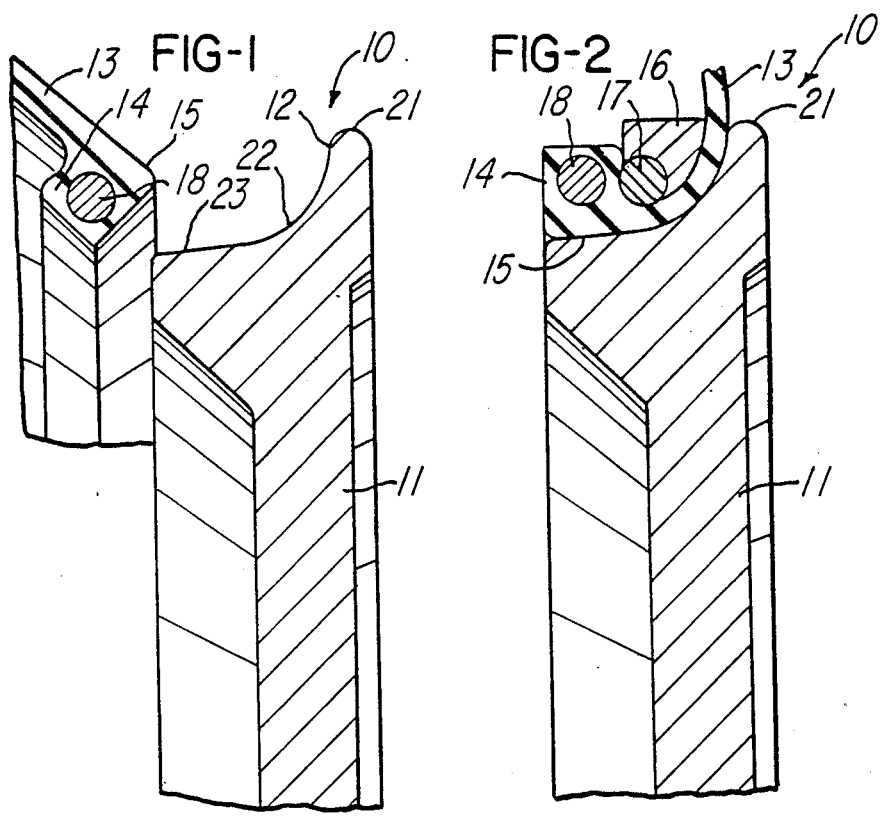
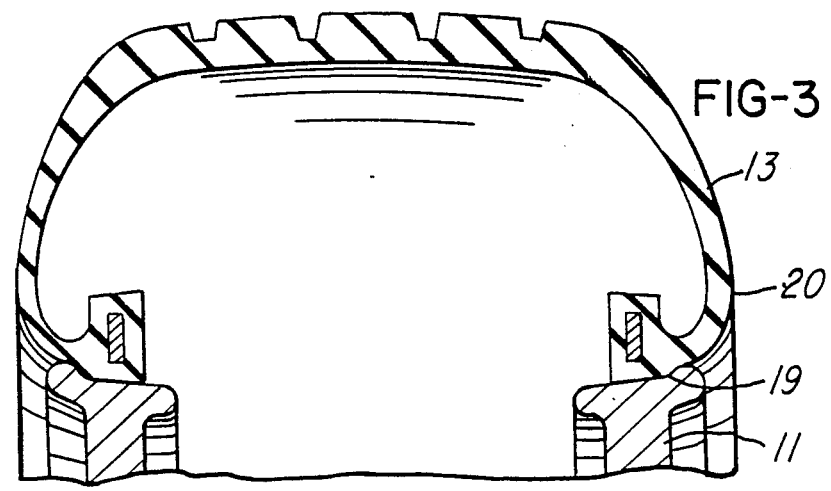

4,922,751

METHOD AND APPARATUS FOR CHECKING THE CONCENTRICITY OR CORRECT CONTOUR OF A PNEUMATIC VEHICLE TIRE

BACKGROUND OF THE INVENTION

The present invention relates to a method and apparatus for receiving a tire, especially for measuring or checking the concentricity or correct contour of a pneumatic vehicle tire that during operation has its bead regions mounted on the radially inner periphery of a wheel rim. A test rim is provided that receives the axially outer bead zones of a tire that is to be checked.

The concentricity of conventional tires, the beads of which are disposed on the radially outer periphery of a rim, is checked by means of a two-part test rim that is disposed against the tire from the outside. In so doing, the two test rim parts that are axially movable relative to one another receive the tire on bead-seating surfaces in the same manner as the vehicle tire is mounted during driving operation. With the newly developed tire/rim system, such as disclosed in German Offenlegungsschrift 30 00 428, where the beads of the tire are disposed on the radially inner periphery of the rim, the problem exists that the test rim must be introduced into the interior of the tire, although it has a greater diameter than the inner diameter of the tire.

To accomplish this, it was proposed in German Offenlegungsschrift 35 41 188 to construct the axially displaceable rim ring sections of several radially adjustable rim segments. In the radially drawn-together state, i.e. with a reduced diameter, such a test rim can be introduced into the tire, which has a smaller inner diameter, and can then be moved apart into the checking position. However, the problem with this is that the interior of the tire must be sealed off and the sidewalls of the tire must be moved out of their trapezoidal form, in which they are heated, into the mounting state.

For this reason, German patent application P 36 04 023.1 proposes checking the concentricity of such a tire in the position where its sidewalls and bead regions are folded laterally outwardly, i.e. in the position in which the tire is heated. However, with such an apparatus the actual operating conditions can be reproduced only to a limited extent, and one is still left with the desire to be able to check tires in their actual mounting position.

It therefore an object of the present invention to provide a method and apparatus with which tires of the aformentioned type can be checked in the mounting position.

BRIEF DESCRIPTION OF THE DRAWING

This object, and other objects and advantages of the present invention, will appear more clearly from the following specification in conjunction with the accompanying schematic drawing, in which:

FIG. 1 is a cross-sectional view of part of the seating surface of one exemplary embodiment of the inventive tire test rim with rim flanges that conform to the vulcanizing mold contour;

FIG. 2 shows the test rim of FIG. 1 with a tire mounted thereon, with this tire being held in position with a forming ring; and FIG. 3 shows the test rim of FIG. 1 with bead shoulders provided on the tire to secure the same on the rim flanges of the test rim.

SUMMARY OF THE INVENTION

The method of the present invention is characterized primarily in that the inner spaces between the bead regions and the adjacent sidewalls of the tire are filled with an insertable holding means.

The apparatus of the present invention for carrying out the inventive method is characterized primarily in that the test rim is provided with vulcanizing mold contour means for receiving initially axially outwardly disposed bead-seating surfaces of the bead regions of the tire, and by forming ring means that are adapted to be disposed in inner spaces present between the bead regions and the adjacent sidewalls of the tire when the tire is mounted on the test rim and the bead-seating surfaces of the bead regions are displaced in such a way that they face readially inwardly.

As a result of these measures, an apparatus is provided with which the test rim can be moved in a conventional manner from axially outwardly of the tire in a direction toward the tire that is to be checked. Sealing and folding-over problems do not occur. The forming ring and/or wire core that is to be inserted assure a reliable and stable seating of the tire on the test rim.

Further specific features of the present invention will be described in detail subsequently.

DESCRIPTION OF PREFERRED EMBODIMENTS

Referring not to the drawing in detail, the checking apparatus 10 illustrated in FIG. 1 essentially comprises a two-part test rim 11, the halves or sections of which can be shifted axially relative to one another. The rim flanges 21 of the test rim 11 are disposed in the region of the bead seats 15 radially and axially outwardly on the sidewalls 20 of the tire 13. The rim flanges 21 are provided with beat-seating surfaces 22 that merge into a rim base 23. The contour of the test rim 11 in the region of the bead-seating surfaces 22 conforms to or matches the heating or vulcanizing mold contour 12 for the tire 13 that is to be checked.

Whereas the bead regions of conventional tires are brought, in the region of the rim flanges, into contact against the sections of the test rim, which sections are moved together from the outside, with the illustrated tire 13, the bead regions 14 of which are moved radially inwardly into operative connection with a rim, the sidewalls 20 of the tire 13 that is to be checked must be folded or bent inwardly so that the outer surfaces thereof are directly radially inwardly.

With the checking apparatus 10 of the present invention, the bead-setting surfaces 15 of the outer surfaces of the tire sidewalls 20 are brought into operative connection with the moved-together test rim 11. So that the tire 13 can be held on the test rim 11 in a stable position, forming rings 16 are provided that can be disposed in the inner spaces between the bead regions 14 and the sidewalls 20.

In place of the forming rings 16, segments caould also be disposed that, as disclosed, for example, in the aforementioned German Offenlegungsschrift 35 41 188, are radially displaceable on guides, and can be automatically introduced into the previously mentioned spaces.

The forming rings 16 can contain wires cores 17 that assure a reliable seating and a stable position of the tire 13 on the test rim 11. The diameters of the wire cores 17 correspond to the diameters of the bead cores 18.

In the embodiment illustrated in FIG. 3, the bead regions 14 are provided with bead shoulders 19 that in the mounted position are directed radially inwardly; these bead shoulders 19 are intended to ensure a reliable seating of the tire 13 on the bead-seating surfaces 22 of the test rim 11. Such a test rim 11 can, in a conventional manner, be moved axially from the outside in the direction of the tire 13 that is to be checked; in so doing, the sidewalls 20 are shifted out of their trapezoidal heating form into the inwardly folded-over mounting position. In this position, the tires 13 can be checked, harmonized, dressed, or inspected. Pursuant to a further inventive embodiment, the test rim is expandable, with the interior of the test rim being sealed off with known rubber sleeves.

The present invention is, of course, in no way restricted to the specific disclosure of the specification and drawing, but also encompasses any modifications within the scope of the appended claims.

What we claim is:

1. A method of checking the concentricity or correct contour of a pneumatic vehicle tire that during operation has its bead regions mounted on the radially inner periphery of a wheel rim, said method including the use of a test rim that receives the axially outer bead zones of a tire that is to be checked, with said method further including the step of:
    filling each inner space between a bead region and an adjacent sidewall of said tire with an insertable holding means.

2. In an apparatus for checking the concentricity or correct contour of a pneumatic vehicle tire that during operation has its bead regions mounted on the radially inner periphery of a wheel rim, said apparatus including a test rim that receives the axially outer bead zones of a tire that is to be checked, the improvement wherein:
    said test rim is provided with vulcanizing mold contour means for receiving initially axially outwardly disposed bead-seating surfaces of said bead regions of said tire; and
    forming ring means that are adapted to be disposed in inner spaces present between said bead regions and the adjacent sidewalls when said tire is mounted on said test rim, and said bead-seating surfaces of said bead regions are displaced to face radially inwardly.

3. An apparatus according to claim 2, in which said forming ring means are segmented forming rings, with the forming rings of opposed bead regions being interconnected and movable in a radial direction.

4. An apparatus according to claim 2, in which wire core means are also adapted to be disposed in said inner spaces between said bead regions and said tire sidewalls.

5. An apparatus according to claim 2, in which said bead-seating surfaces of said bead regions of said tire are provided with bead shoulders that correspond to said vulcanizing mole contour means of said test rim.

6. An apparatus according to claim 2, in which said test rim is expandable.

7. An apparatus according to claim 2, in which said forming ring means have a contour that conforms to an inner contour of said tire between said bead regions and said sidewalls thereof.

* * * * *